June 10, 1969     B. H. PARKS     3,448,942
TWO SPEED FISHING REEL DRIVE
Original Filed Nov. 19, 1962

INVENTOR.
BERT H. PARKS
BY
*Shoemaker and Mattare*
ATTORNEYS

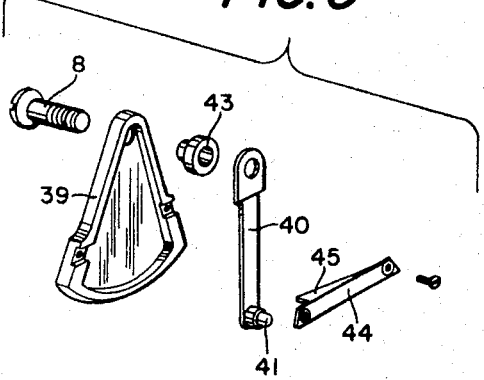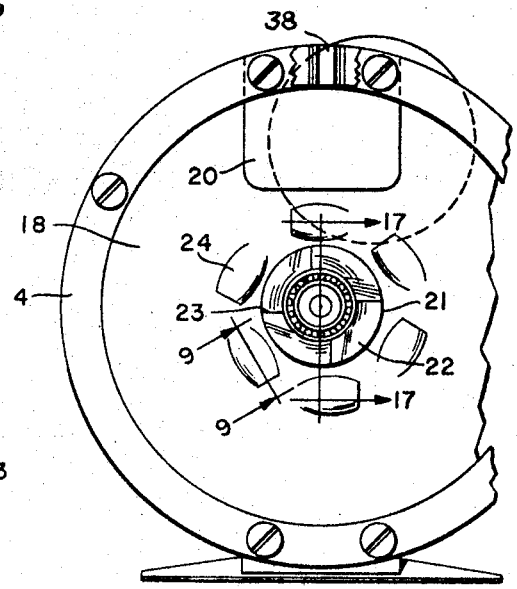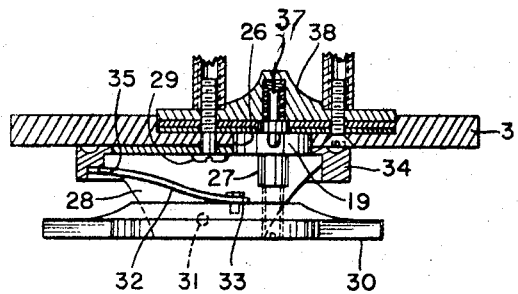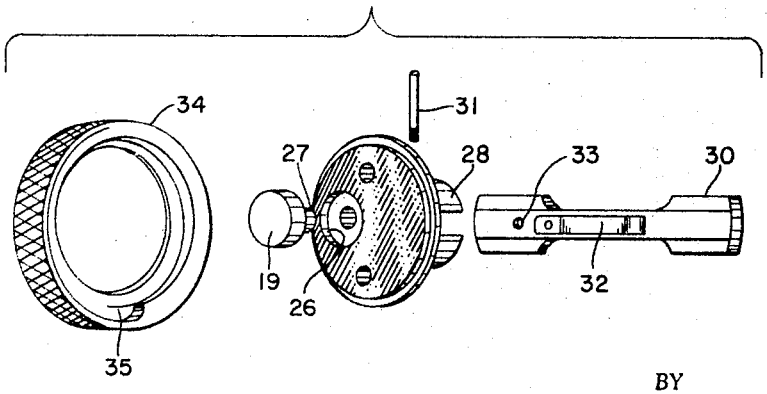

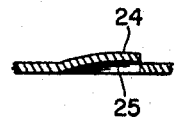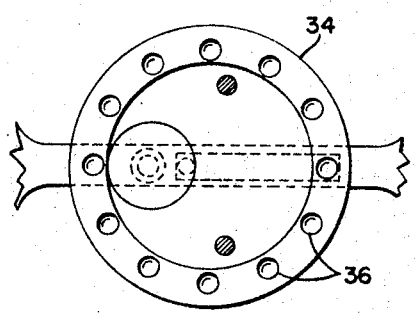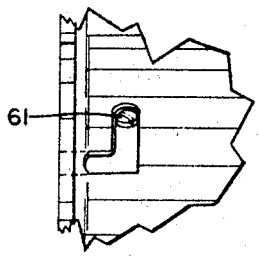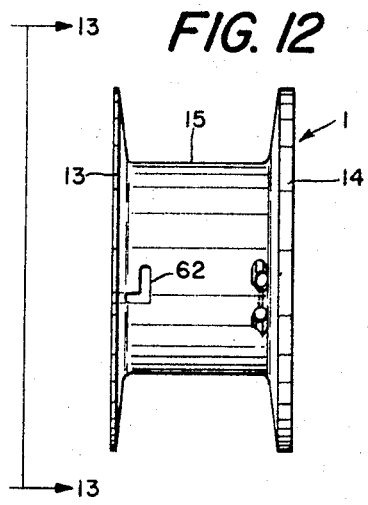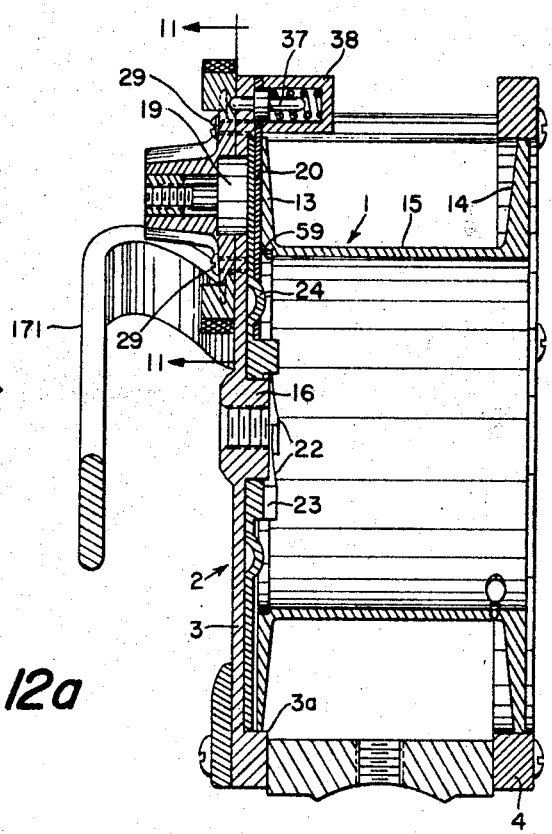

June 10, 1969  B. H. PARKS  3,448,942
TWO SPEED FISHING REEL DRIVE
Original Filed Nov. 19, 1962  Sheet 4 of 10
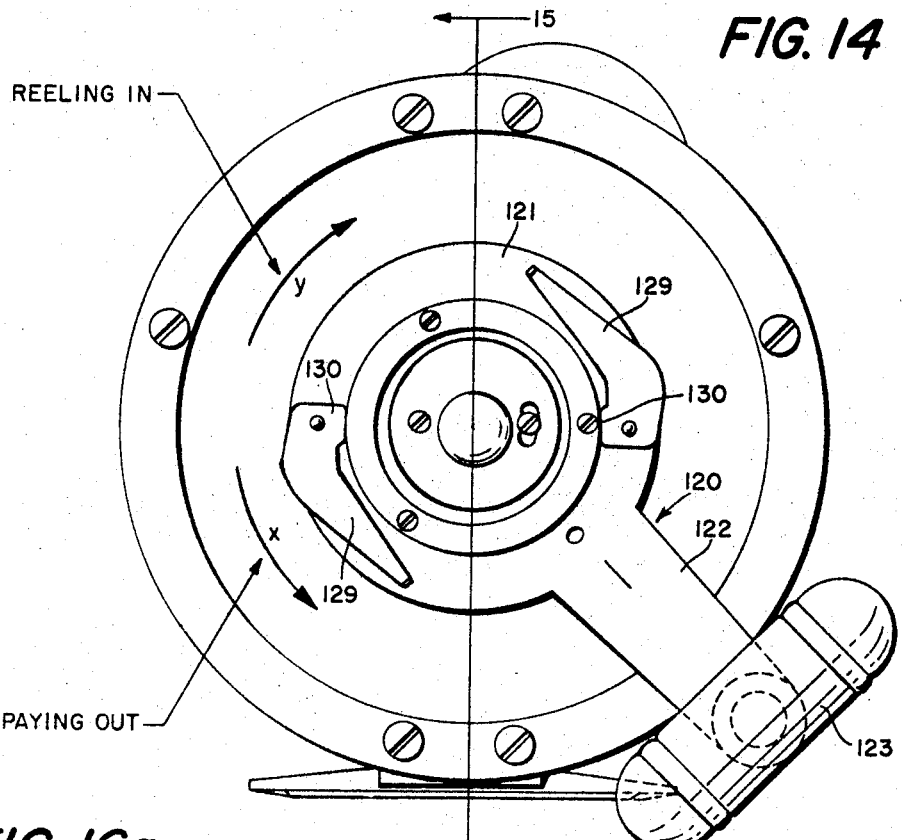
FIG. 14
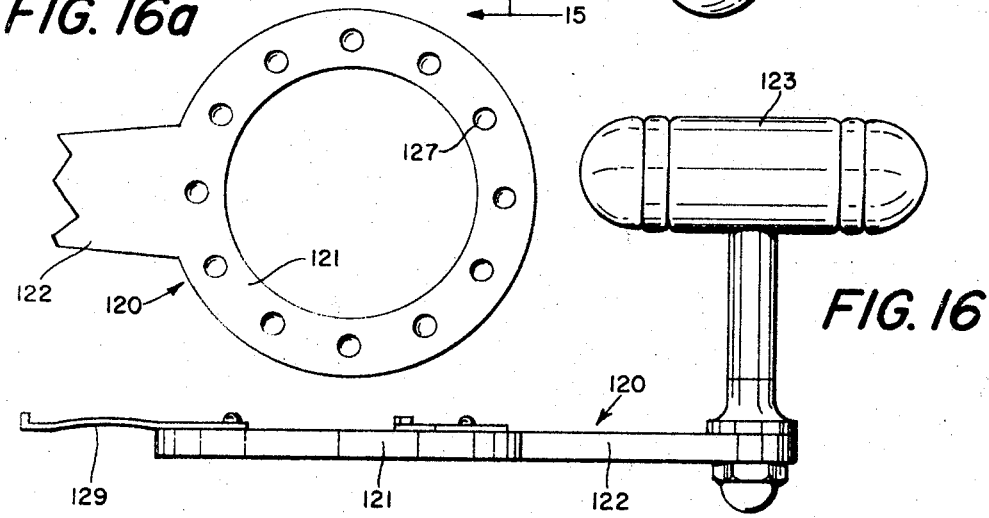
FIG. 16a
FIG. 16
INVENTOR.
BERT H. PARKS
BY
Shoemaker and Mattare
ATTORNEYS

INVENTOR.
BERT H. PARKS
BY
ATTORNEYS

June 10, 1969     B. H. PARKS     3,448,942
TWO SPEED FISHING REEL DRIVE
Original Filed Nov. 19, 1962     Sheet 6 of 10
FIG. 17
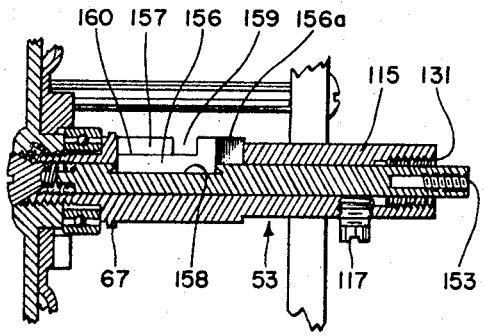
FIG. 18
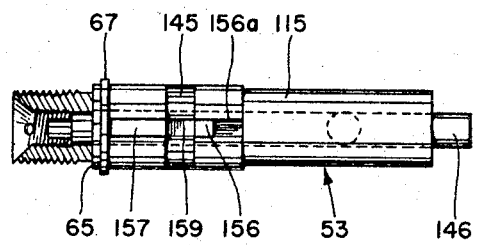
FIG. 17a
FIG. 18a
FIG. 19
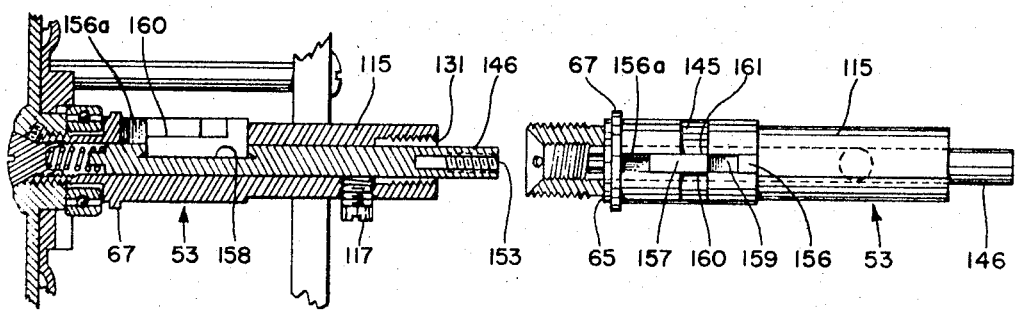
FIG. 17b
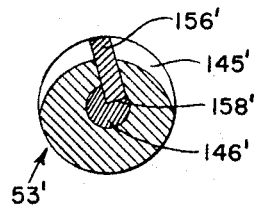
INVENTOR.
BERT H. PARKS
BY
*Shoemaker and Mattare*
ATTORNEYS June 10, 1969   B. H. PARKS   3,448,942
TWO SPEED FISHING REEL DRIVE
Original Filed Nov. 19, 1962

INVENTOR.
BERT H. PARKS
BY
Shoemaker and Mattare
ATTORNEYS

INVENTOR.
BERT H. PARKS

BY Shoemaker and Mattare

ATTORNEYS

United States Patent Office 3,448,942
Patented June 10, 1969

3,448,942
TWO SPEED FISHING REEL DRIVE
Bert H. Parks, Grants Pass, Oreg., assignor to Rogue
Reels, Inc., a corporation of California
Continuation of application Ser. No. 386,368, July 30,
1964, which is a continuation of application Ser. No.
238,679, Nov. 19, 1962. This application Apr. 25, 1966,
Ser. No. 545,161
Int. Cl. A01k 89/00
U.S. Cl. 242—84.54                                30 Claims

ABSTRACT OF THE DISCLOSURE

A two-speed transmission usable in a fishing reel employs planetary gearing so that a manually operated center pin is axially shifted to position a gate between a closed position wherein a planetary carrier is locked from turning with the input to produce a first drive ratio to the output spool and a second position wherein the carrier is free to turn with the input to produce a one-to-one drive to the spool.

---

This application is a continuation of my copending application Ser. No. 238,679, filed Nov. 19, 1962, and now abandoned.

This invention relates to improvements in fishing reels and proposes a novel and advantageous construction which utilizes planetary gearing for the operation of reeling in the line and which also enables such gearing to be operable in relation to the rotation of the handle, and according to the election of the fisherman, at different ratios, namely, a one to one ratio or a predetermined multiple ratio, for example, two to one or some greater multiple, the selection of which is determined in the manufacture of the reel.

In fishing for varieties noted for weight, strength and fighting qualities, and ranging in weight from about ten pounds to hundreds of pounds it has long been known that the line, as controlled by the reel, should be taut but no prior reel is known to me by which substantially constant tine tautness may be satisfactorily achieved. In the prior reels some slackness of the line periodically occurs before the fish is landed and for various reasons frequently results in the loss of the fish.

Therefore the principal object is a reel in which in reeling in the line the spool is at all times under the control of the gearing whereby its speed of rotation relatively to the rotation of the handle may be adapted to the lunges of the fish at varying speeds and in varying directions; in which the changes in the ratio of the gearing, which may be required many times before landing the fish, may be made instantly and with optimum facility by the fisherman; and hence in which slackness of the line is substantially avoided and the tautness of the line may be substantially uninterrupted until the fish is landed.

A further object is a reel in which in changing from one gear ratio to another the gears remain constantly in mesh as set in the manufacturing operation, no change in the meshing of the gears being required.

A further object is a reel in which the gear transmission is completed housed within the hub of the spool and is thereby fully protected against salt water, salt air, any other element that might have a corrosive action, and dirt or sand.

A further object is a reel which will enable quick and facile interchangeability of spools whenever it may be desired to use lines of different lengths, strengths or types.

A further object is a reel in which the means for changing from one ratio to another is literally "under the thumb" of the fisherman at the side of the reel where the handle is located.

A further object is a reel having a train of gear elements enclosed within a gear casing connected to the spool for rotation as one and operable in reeling in the line by the cooperation of a clutch ring and a clutch plate with means under the control of the fisherman for establishing an operative or inoperative relation of the clutch ring and the clutch plate.

A further object is a reel which, having the advantages above noted, may have its gear elements incorporated, in a reel of the substantial construction and with the substantial advantages of the reel disclosed by my U.S. Patent No. 2,993,660 of July 25, 1961.

A still further object of the invention is the provision of a novel transmission mechanism for converting the rotary motion of a driving member into rotary motion of a driven member at different selected speed ratios without the need of changing gears or interrupting rotation of the driven member.

A reel in accordance with the invention, having in mind all of the objects above stated, is generally characterized by a rotatable unit mounted within and detachably connected in driving relation to the hub of the spool, the unit being rotatable in either direction upon a central tubular arbor and including a gear casing, a gear carrying disc enclosed within the casing, gears within and carried by the casing and cooperating with the gears carried by the disc, a shift rod mounted within the arbor, and a gate carried by the shift rod which may be opened or closed relatively to a peripheral passage in the arbor accordingly as the fisherman positions the shift rod in the selection of a gear ratio, the unit being operatively connected to the reel handle and running free with the handle held stationary when the line is paid out as in casting, trolling, or when the fish takes the lure and gear operated by turning the handle when the line is reeled in.

The reel is also characterized by other novel features of structure and combination which will be pointed out as the description proceeds.

In the drawings:

FIGURE 5 is an exploded perspective view showing externally located parts of the click mechanism.

FIGURE 6 is a fragmentary side elevation of the cage element per se, looking toward the floating disc.

FIGURE 7 is a detail horizontal sectional view on the line 7—7 of FIGURE 2 showing the brake feature.

FIGURE 8 is an exploded perspective view showing the several parts which constitute the brake feature.

FIGURE 9 is a detail sectional view on the line 9—9 of FIGURE 6.

FIGURE 10 is a central vertical sectional view on the line 10—10 of FIGURE 1 (with elements of the gearing omitted).

FIGURE 11 is an elevation of the braking feature viewed in the plane 11—11 of FIGURE 10.

FIGURE 12 is an elevation of the spool.

FIGURE 12a is a partial elevation of the spool hub showing the operative connection between it and the gear casing.

FIGURE 13 is a side elevation of the spool shown in FIGURE 12 as viewed in the plane 13—13 of FIGURE 12.

FIGURE 14 is an elevation of the reel as viewed from the side reverse from the side shown in FIGURE 1.

FIGURE 16 is an edge elevation of the reel handle by which the line is reeled in.

FIGURE 16a is a partial elevation of the handle of the reel viewed at the side reverse to the side shown in FIGURE 14.

FIGURE 17 is a detail fragmentary transverse sectional view on the line 17—17 of FIGURE 6 and shows sundry details of a central arbor and of a gate which is associated with the arbor, the gate being in open position.

FIGURE 17a is a view similar to FIGURE 17 but showing the gate in closed position.

FIGURE 17b is a detail cross sectional view showing a colorable variation of the gate arrangement shown in FIGURE 17.

FIGURE 18 is an elevation, partly in section, of the arbor as shown in FIGURE 17 with the gate in open position.

FIGURE 18a is a view similar to FIGURE 18 but showing the gate in closed position.

FIGURE 19 is an exploded perspective view of a shift rod and certain associated parts used in effecting the opening and closing of the gate.

Figure 15:
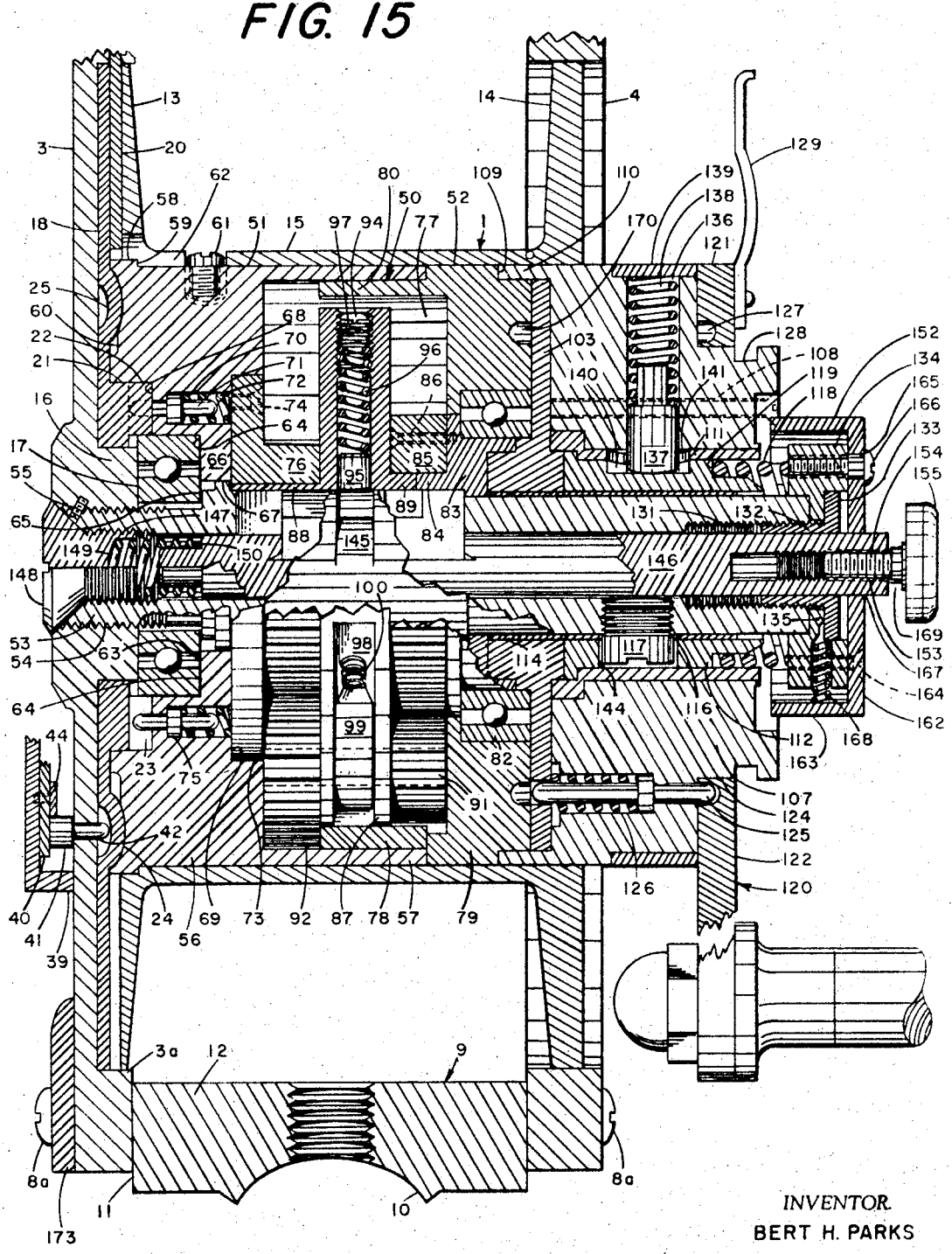
FIGURE 15 is a central longitudinal sectional view of the reel on the line 15—15 of FIGURE 14, the section being partly broken away for clarity of illustration.
Figure 20:
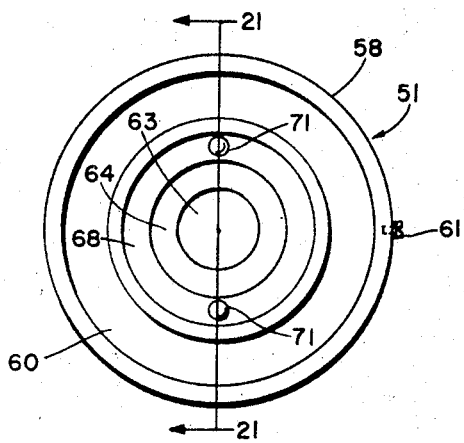
FIGURE 20 is a side elevation of the outer member of the gear casing utilized in effecting the rotation of the spool.
Figure 21:
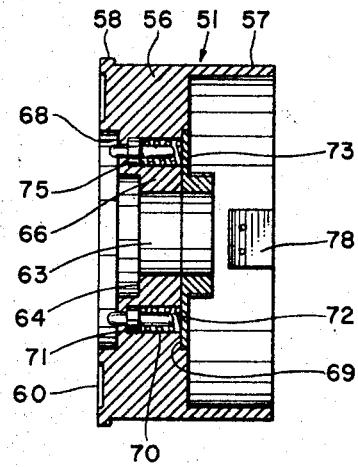
FIGURE 21 is a vertical sectional view on the line 21—21 of FIGURE 20.

In aid of the reading of this specification it is noted that in the following description and in the claims the designations "outer" and "inner" are frequently used. Their usage is arbitrary and is with reference to the positions and relations of the parts as shown in FIGURE 15. Thus "outer" connotes parts or surfaces at, or directed to, the left or related parts or surfaces and "inner" similarly connotes parts or surfaces at, or directed to, the right of related parts or surfaces.

Figure 1:
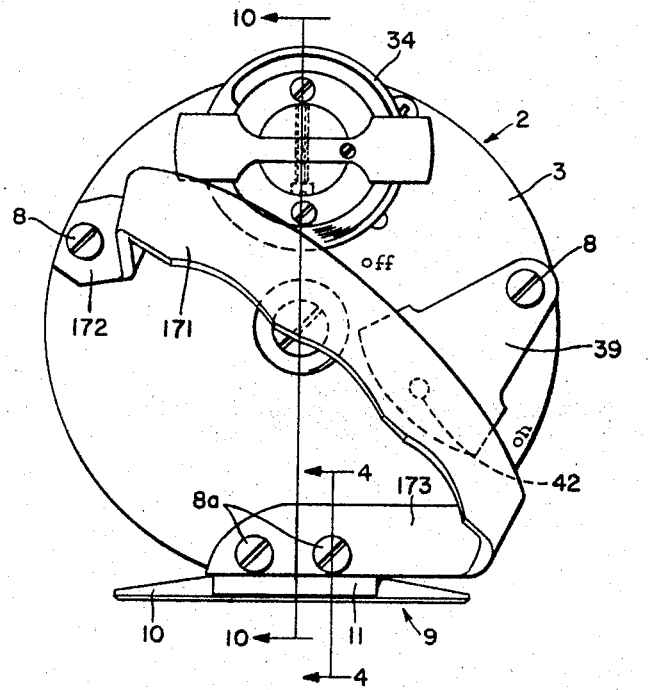
FIGURE 1 is a side elevation of the reel.
Figure 3:
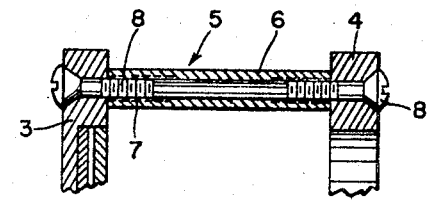
FIGURE 3 is a detail sectional view of one of several fastenings included in the cage element.
Figure 4:
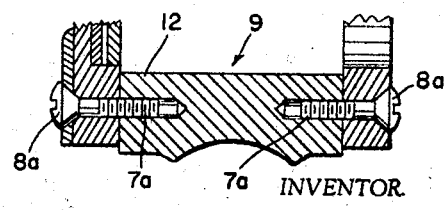
FIGURE 4 is a detail cross-sectional view on the line 4—4 of FIGURE 1.

The spool 1 (FIGURE 10) is arranged within a cage 2 which is preferably of the construction, including the braking features, shown in my Patent No. 2,993,660. For convenience the features of my present reel in common with the reel shown in my patent are briefly summarized. The cage 2 includes a wall 3 and a ring 4 connected in spaced parallel planes by fastenings 5 (FIGURE 3), each consisting of a transversely arranged tubular bar 6 having internally threaded end portions 7 for screws 8 with their heads bearing against the outer faces of the wall and ring. The reel mounting element 9 (FIGURES 1 and 4) is also utilized for the connection of the wall and ring. Thus it includes a rod engaging shoe 10 and a centraly located body portion 11 terminating in a head 12 fitted between the wall and ring and formed with threaded recesses 7a for connecting screws 8a. The spool includes spaced parallel walls 13 and 14 and a connecting hub 15 upon which the line is wound, the wall 13 fitting within a recess 3a of the wall 3 and the wall 14 fitting within the ring 4. The wall 3 is formed with a central annular boss 16 which is abutted by a ball bearing 17 and provides a mounting for a floating disc 18 which rotates at the same rate as the spool when the line is paid out and to which a drag or braking pressure may be applied at such time, the disc being held against rotation when the line is reeled in. The floating disc adjoins the inner face of the wall 3 and has a scarcely perceptible axial movement upon the boss 16 in connection with the application and release of the drag or braking pressure. The drag or braking action is effected by a shoe 19 and a brake plate 20, these parts being located in an off-center position and adjoining the opposite faces of the disc 18. The shoe is located in alinement with the brake plate whereby upon the application of the drag or braking pressure the floating disc is, in effect, clamped between the plate and the shoe. The plate 20 has openings for two of the screws 8a and is clamped against the wall 3 by the tubular bars 6 into which the screws are tapped. The disc 18 is provided on its inner face with a concentric projection 21 which immediately surrounds the ball bearing 17 and between its circumferential faces is formed with an annular series of arcuate cams 22 (FIGURE 6), in any suitable number in accordance with the size of the reel. The cams extend in the same direction and each has an arcuate rise to an abrupt radially directed shoulder 23. The floating disc also provides cams 24 (FIGURES 6 and 9) as parts of the click feature, these confronting the wall 3 and being upset channels 25 in an annular series concentric to the cams 22. The cams 24 have their inclinations reverse to the inclinations of the cams 22, i.e. inward from their deep ends toward the disc 18. The brake shoe 19 (FIGURES 7 and 10) is laterally movable through an opening 26 in the wall 3 and is provided with an outwardly projecting stud 27 which extends into an opening in a bracket 28 attached by screws 29 to the wall 3. The drag or braking action is applied by a two-armed lever 30 (FIGURE 7) movable about a pivot 31 in a diametrical groove in the bracket 28. The action of the lever 30 is subject to a leaf spring 32 attached to it as at 33. The pressure of the leaf spring upon the lever is controlled by a ring 34 adjoining the cage wall 3 and rotatably adjustable upon the bracket 28. The outer face of the ring 34 is formed with a cam surface 35 (FIGURES 7 and 8) extending clockwise through approximately 180 degrees, its elevated end merging with the flat face of the ring. The free end of the spring bears upon the cam surface and when it is at the deepest end of the cam surface the pressure of the spring is minimum, increasing as the ring is turned counterclockwise thus increasing the drag on the reel. When the free end of the spring is at the elevated end of the cam surface 35 the drag force is maximum. In any position of the ring 34 the lever 30 may be moved in opposition to the spring, thereby to relieve the drag force or conversely away from the cage wall. For convenience of adjustment of the drag the circumferential edge of the ring may be knurled with a portion preferably projecting (FIGURE 1) beyond the cage wall. In order to prevent accidental movement of the ring its inner face is formed with a series of recesses 36 (FIGURE 11), severally to cooperate with a spring loaded latch pin 37 movable through an opening in the cage wall. In the construction herein shown the pin 37 and its loading spring are fitted within a casing 38 which is conveniently attached to the brake plate 20. The ring 34 also has numbers thereon agreeing with the number of recesses 36 to indicate both the amount of drag applied to the disc 18 and setting of the ring 34 at the indicating point.

The click mechanism herein shown (FIGURES 1, 5 and 15) differs somewhat in details from the click mechanism shown in my patent and is more conveniently operated. It includes a triangular casing 39 pivotally mounted on one of the screws 8. The operating part of the click mechanism is a leaf spring 40 having a fixed end and a free end formed with a finger 41 for movement through an opening 42 in the wall 3, the finger 41 in a released position of the leaf spring being engageable with the cams 24 of the floating disc 18 and in a retracted position of the leaf spring being held in disengaged relation. The spring 40 has a fixed end provided with a terminal opening to accommodate the screw 8 and is tightly clamped against the cage wall 3 by a collar 43 fitted upon the screw 8. The spring 40 tends to move toward the cage wall 3 and its position is determined by a transverse strap 44 having for about half of its length an edge flange 45. The strap 44 is secured at its ends to the casing 39 and extends between the leaf spring and the cage wall 3. In one position of the casing 39 about its pivot the edge flange 45 engages the spring and holds it retracted (FIGURE 15), the click mechanism being thereby inoperative, and in the opposite position of the casing 39 the edge flange is disengaged from the spring which thereupon springs toward the wall 3 whereby its finger 41 will engage the cams 24 with resultant clicking noise when the fish takes the lure and the spool rotates to pay out the line.

The reel construction above described, although not patentably new per se, is utilized in connection with intrinsically novel features of the invention and as an element of certain combinations into which the invention may be resolved.

In the spool of a reel in accordance with my invention the inner side wall 14, as shown in FIGURES 10 and 12, is of suitably greater thickness than the outer side wall 13 in order to achieve a satisfactory balance, the reduced thickness of the wall 13 being selected to provide space for the floating disc 18 which is interposed between it and the cage wall 3. As shown in FIGURE 12 the spool hub 15 is provided adjacent the wall 14 with openings which enable the line to be tied to the spool.

The invention includes a gear casing, generally designated as 50, which is arranged within the spool hub 15 and so detachably connected to the spool as to effect its rotation when the line is reeled in and to rotate with it when the line is paid out. The casing 50 consists of axially alined outer and inner members 51 and 52 rotatably mounted upon a central transverse tubular arbor 53. One end of the arbor (its left end, FIGURE 15 being considered) is fixedly connected to the cage wall 3, being provided with external threads 54 in mesh with corresponding threads in a central opening of the cage wall and being fixed against displacement by an angularly extending screw 55 tapped through an opening in the arbor and into a recess of the threaded opening in the cage wall.

Figure 22:
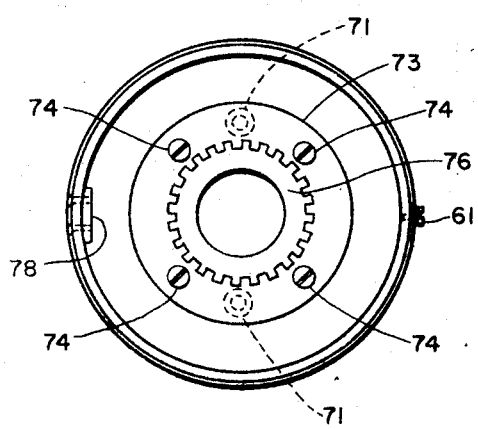
FIGURE 22 is an opposite side elevation of the outer member of the gear casing shown in FIGURE 20.

The outer gear casing member 51 (FIGURES 15, 20, 21 and 22) comprise a base 56 of disc outline which adjoins the floating disc 18 and is formed with an inwardly projecting annular flange 57. The outer circumferential faces of the base 56 and the flange 57 are flush whereby the member 51 has a snug fit within the spool hub 15. The base 56 has adjacent the floating disc a peripheral flange 58 for abutment by a corresponding internal shoulder 59 at the outer end of the spool hub 15, thereby to insure the accurate positioning of the spool upon the gear casing 50. An annular groove 60 on the outer side face of the base 56 accommodates the click feature cams 24 provided on the floating disc 18. The base 56 is connected to the spool 1 to effect its rotation with the gear casing, the connection conveniently consisting of a periperal projecting 61 (preferably in the form of a screw head) on the base 56 and an L-shaped slot 62, similar to a bayonet slot, in the spool hub 15. The slot 62 (FIGURES 12 and 12a) has a peripherally extending portion and a longitudinally extending portion which is continued for some distance along the spool wall 13. The projection 61 has a normal position in the distal end of the peripheral portion of the slot, remaining in this position during the rotation of the spool in either direction. The base 56 has its outer face formed with a recess 63 (FIGURE 15) which accommodates the ball bearing 17, the outer ring of this bearing adjoining the circumferential wall of the recess 63 and being confined by a shoulder 64 on the annular wall of the recess. The inner ring of the ball bearing is confined between the hub of the cage wall 3 and an annular shoulder 65 formed on the arbor 53. The recess 63 is occluded by a hub portion 66 which has a rotatable fit upon a peripheral flange 67 of the arbor 53. The base 56 has its outer face provided with a recess 63 which accommodates the concentric projection 21 of the disc 18. The inner face of the base 56 is provided with a recess 69 which is open to countersunk recesses 70 in which are fitted pins 71 and their loading springs 72. The pins 71 project through openings which extend to the recess 68 whereby the pins may be moved by their loading springs into positions in which they engage the shoulders 23 of the cams 22, thereby to cause the floating disc 18 and the gear casing (and hence the spool) to rotate as one when the line is paid out, such rotation of the floating disc being under the control of the drag or brake features above described and the drag or braking action being transmitted by the cam shoulders 23 and the pins 71 to the outer member of the gear casing. When the line is reeled in the pins 71 ride idly over the inclined surfaces of the cams 22, being moved inward against the pressure of their loading springs. The recess 69 accommodates a disc-shaped plate 73, which is rigidly secured to the base 56 as by screws 74 (FIGURE 22 and in broken lines in FIGURE 15). The plate 73 occludes the inner ends of the recesses 70 and the springs 72 react against the plate 73 and collars 75 fixed on the pins 71. The plate 73 carries a spur gear 76 which is an element of the gear system by which the gear casing is rotated and is located within the chamber 77 provided by the gear casing. The flange 57 of the outer member of the gear casing is provided on its inner face with a key 78 of rectangular outline. It will be noted that in the construction shown in my Patent No. 2,993,660 the floating disc is operatively connected by a spring loaded pin or pins directly to the hub of the spool whereas in my present invention the floating disc is so connected to the inner member of the gear casing which is in turn operatively connected to the spool.

Figure 25:
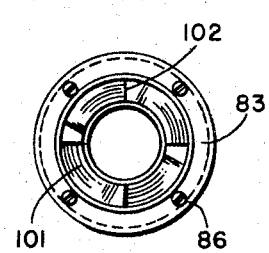
FIGURE 25 is a side elevation of a clutch part associated with the inner member of the gear casing in combined relation with a spur gear.
Figure 26:
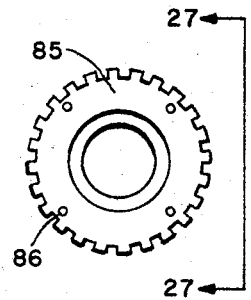
FIGURE 26 is a side elevation of the spur gear which is rigidly connected to the clutch part shown in FIGURE 25.
Figure 28:
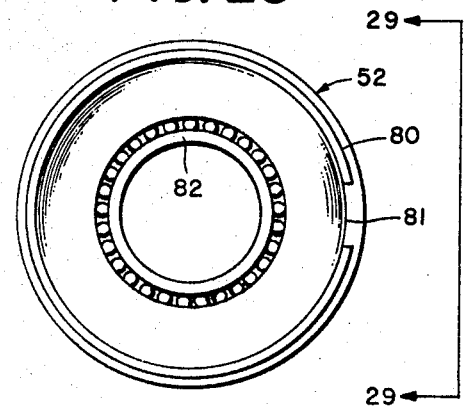
FIGURE 28 is a side elevation of the inner member of the gear casing.
Figure 29:
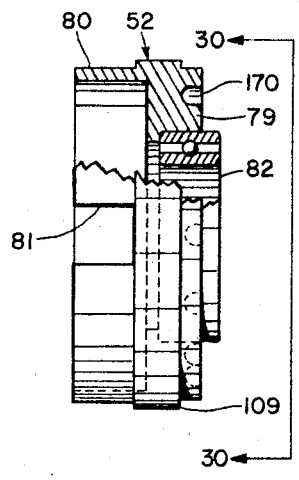
FIGURE 29 is an elevation, partly in section, of the gear casing member shown in FIGURE 28 as viewed in the plane 29—29 of FIGURE 28.
Figure 30:
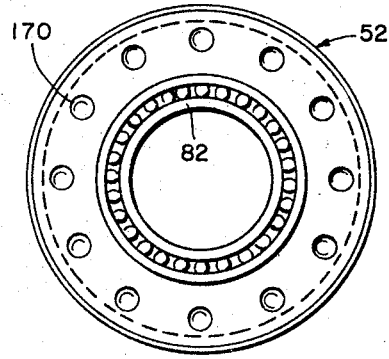
FIGURE 30 is an opposite side elevation of the gear casing member shown in FIGURE 28.

The inner gear casing member 52 (FIGURES 15, 28, 29 and 30) comprises a base 79 of disc outline provided with an outwardly projecting annular flange 80 having an external diameter coextensive with the internal diameter of the flange 57 and less by the thickness of the flange 57 than the diameter of the peripheral surface of the base 79. The flange 80 fits telescopically within the flange 57 to complete the chamber 77 and effect its closure and the peripheral surface of the base 79 is flush with the peripheral surface of the flange 57 and has a snug fit within the hub of the spool. The flange 80 is provided with a recess 81 (FIGURES 28 and 29) which is functionally a keyway for the key 78, the two members of the gear casing being thereby coupled in accurate positional relation for rotation as one. The inner gear casing member 52 has its inner face formed with a recess to accommodate the outer ring of a ball bearing 82 and its base 79 is formed with a central opening in which is journalled a gear carrying clutch ring 83, the inner ring of the ball bearing 82 being fitted upon the peripheral surface of the ring 83. The ring 83 is rotatable upon the arbor 53 and is formed with an outwardly directed hub flange 84. A spur gear 85 is fitted upon the hub flange 84 and abuts the ring 83 to which it is rigidly connected by screws 86 (sufficiently indicated in FIGURES 25 and 26 and one of which is shown in broken lines in FIGURE 15).

Figure 23:
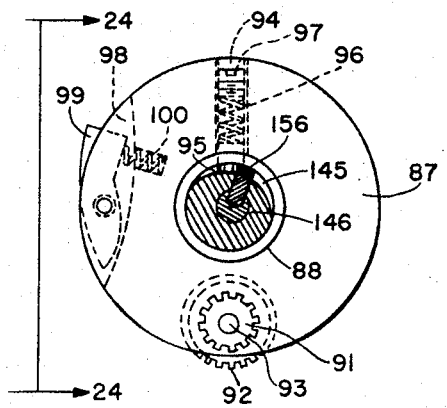
FIGURE 23 is a side elevation of the gear carrying disc in which the arbor and the shift rod are shown in section and the gate is closed.
Figure 23A:
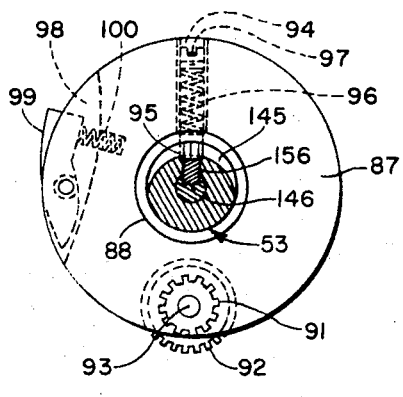
FIGURE 23a is a side elevation of the gear carrying disc in a position at the start of a revolution and with the gate open.
Figure 24:
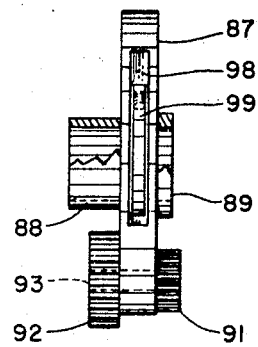
FIGURE 24 is an elevation, partly in section, of the gear carrying disc as viewed in the plane 24—24 of FIGURE 23.

The gear system includes a gear carrying disc 87 (FIGURES 15, 23 and 24) mounted within the chamber 77 and formed with oppositely directed hub flanges 88 and 89 by means of which it is mounted for rotation upon the arbor 53, the flanges 88 extending through a central opening of the plate 73 and abutting the peripheral flange 67 provided on the arbor 53 and the flange 89 extending into the central opening of the gear 85 and abutting the flange 84 of the clutch ring 83. The gear system also includes the spur gears 76 and 85 above referred to, a spur gear 91 meshing with the spur gear 85, and a spur gear 92 coaxial with the spur gear 91 and meshing with the spur gear 76, the spur gears 91 and 92 being mounted upon a transverse shaft 93 (FIGURE 23) journalled eccentrically in the disc 87. In the aspect of a multiple gear ratio the spur gear 91 is of less diameter than the spur gear 85 with which it meshes, and the spur gear 92 is of greater diameter than the coaxial spur gear 91. As to the several spur gears, a two to one ratio of rotation of the spool may be assumed. It will, of course, be understood that the diameters of the several spur gears may be selected to provide for a greater multiple, e.g. three to one, if so desired and that the particular ratio is determined at the time of manufacture of the reel.

The disc 87 is formed with a radially extending opening 94 (FIGURE 15) between its peripheral face and the face of its central opening. The opening 94 encloses a pin 95 which extends beyond the central opening of the disc and is loaded by a spring 96 which reacts against a plug 97 tapped into the outer end portion of the opening 94. The pin 95 cooperates with a gate (later to be described in detail) by the open or closed position of which a selection of the gear ratio is determined by the fisherman. The disc 87 is formed with a peripheral recess 98 (FIGURE 23 and 24) which accommodates a pivoted pawl 99 held by the pressure of a loading spring 100 to project beyond the periphery of the disc 87. The key 78 has a thickness such that it projects beyond the inner surface of the flange 80 in order to cooperate with the pawl 99. When the reel is operated to reel in the line the pawl 99 engages the key 78 for purposes later to be described. When the line is paid out the gear system idles and the disc 87 is stationary, the key 78 merely riding over the pawl 99. It will be noted that the chamber 77 is completely closed and hence that the gear system within the chamber is fully protected against corrosion by salt water or salt air as well as against dirt or sand.

Figure 27:
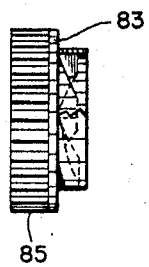
FIGURE 27 is an elevation of the combined clutch part and spur gear shown respectively in FIGURES 25 and 26 as viewed in the plane 27—27 of FIGURE 26.
Figure 31:
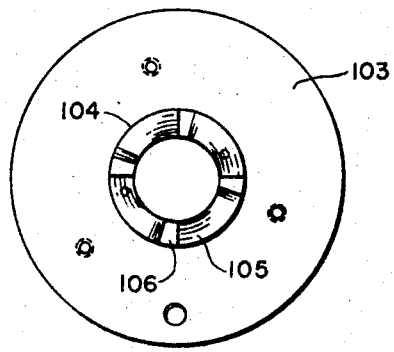
FIGURE 31 is a side elevation of a clutch plate having cam faces in cooperative relation with the clutch part shown in FIGURE 25.
Figure 32:
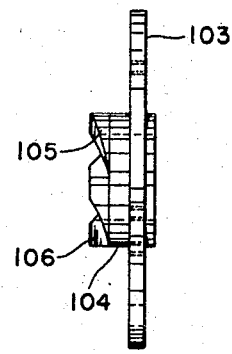
FIGURE 32 is an edge elevation of the clutch plate shown in FIGURE 31.
Figure 33:
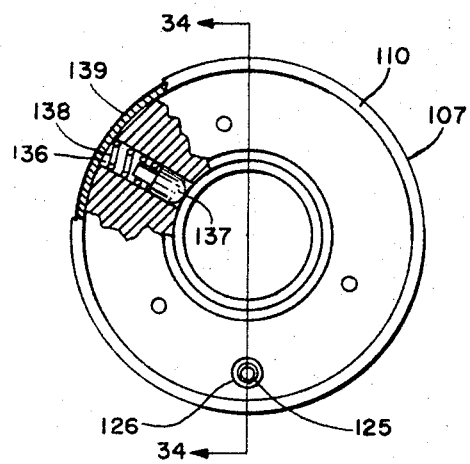
FIGURE 33 is a side elevation, partly in section, of a journal member for the gear casing and to which is attached the clutch plate shown in FIGURES 31 and 32.
Figure 34:
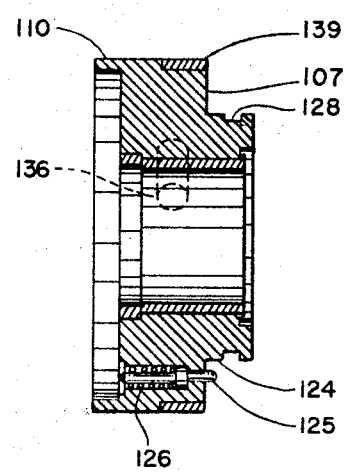
FIGURE 34 is a vertical sectional view on the line 34—34 of FIGURE 33.
Figure 35:
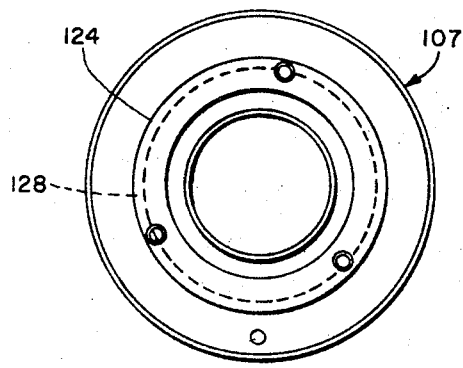
FIGURE 35 is an opposite side elevation of the journal member shown in FIGURE 33.
Figure 36:
FIGURE 36 is an elevation of a ring carried by the journal member and serving to confine a spring loaded element.

The clutch ring 83 is formed on its inner face (FIGURES 25 and 27) with an annular series of arcuate cams 101 which provide radially directed shoulders 102. The clutch ring is in cooperation with a clutch plate 103 (FIGURES 15, 31 and 32) having a hub 104 which is formed on its outer face with an annular series of arcuate cams 105 providing radially directed shoulders 106, the cams 105 extending in the opposite direction from the cams 101. In reeling in the line the clutch plate rotates with the handle (to be later described) and the shoulders 106 by engagement with the shoulders 102 effect the rotation of the clutch ring 83 and spur gear 85 and the consequent rotation of the gear casing at the selected ratio. The clutch plate adjoins the outer side of an annular journal member 107 (FIGURES 15, 33, 34 and 35) to which it is rigidly connected by screws 108 (shown in broken lines in FIGURE 15 and sufficiently indicated in FIGURES 33 and 35 by the showing of the openings therefor). The journal member 107 is located partly within the spool hub and partly beyond the spool hub, projecting to the right, FIGURE 15 being considered. The base 79 of the inner gear casing member 52 has its inner side portion of reduced diameter to provide an annular shoulder 109 and the journal member 107 is formed with an outwardly projecting annular flange 110 having its peripheral surface flush with the peripheral surface of the base 79, the flange 110 fitting over the reduced portion of the base 79 and abutting the shoulder 109. The flange 110 encloses the clutch plate 103 and in the assembly of the reel facilitates its centering relatively to the journal member 107.

Figure 37:
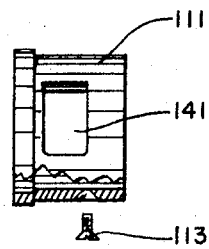
FIGURE 37 is an elevation, partly in section, of a cam collar in association with the journal member, this figure also showing in separate relation a screw by which the collar is secured to a concentric cam.
Figure 38:
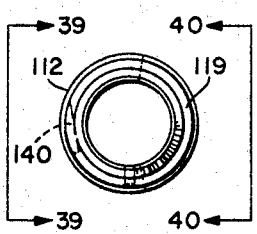
FIGURE 38 is an end elevation of the cam which is fitted within the collar shown in FIGURE 37.

The central opening of the journal member accommodates a cam collar 111 (FIGURES 15 and 37) which encloses a cylindrical cam 112 surrounding the arbor, the cam collar being rigidly connected to the cylindrical cam be a screw 113. The journal member 107 is mounted for rotation upon the cam collar 111 and the cam 112 is mounted for rotation upon the arbor and abuts the hub of the clutch plate 103. The cam 112 and the clutch plate 103 are preferably directly mounted upon a wear resisting bushing 114 which may be considered as a part of the arbor 53, it being immovably fitted upon a portion 115 of the arbor which is of reduced diameter (FIGURES 17 and 18) and having an opening 116 for a radially projecting pin 117 carried by the arbor.

Figure 40:
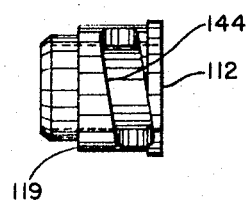
FIGURE 40 is a side elevation of the cam shown in FIGURE 38 as viewed in the plane 40—40 of FIGURE 38.
Figure 41:
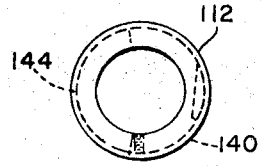
FIGURE 41 is an opposite end elevation of the cam shown in FIGURE 38.
Figure 42:
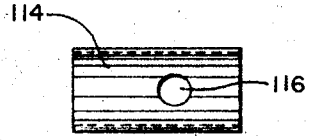
FIGURE 42 is an elevation of a bushing upon which the cam rotates.
Figure 43:
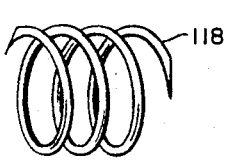
FIGURE 43 is a perspective view of a loading spring for the cam.
Figure 44:
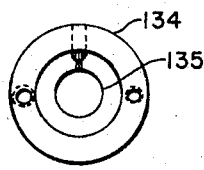
FIGURE 44 is a side elevation of a collar carried by the arbor and against which the loading spring shown in FIGURE 43 reacts.
Figure 45:
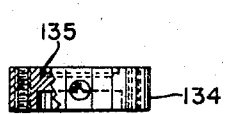
FIGURE 45 is an elevation, partly in section, of the arbor carried collar.
Figure 46:
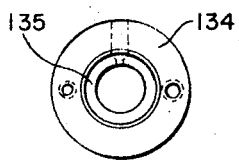
FIGURE 46 is a reverse side elevation of the arbor carried collar.

The journal member 107, the attached clutch plate 103, the cam collar 111 and the cam 112 are slidably mounted as a unit upon the bushing 114 and are movable between an outer position in which the shoulders 106 of the clutch plate cams 105 and the shoulders 102 of the clutch ring cams 101 are in engaged relation and an inner position in which they are in disengaged relation. The positioning of the unit for the engagement of the shoulders 106 and 102 is effected (FIGURES 15 and 43) by a loading spring 118 which extends into a recess between the cam collar 111 and the cam 112 and at its outer end bears against an annular shoulder 119 (FIGURES 15 and 40) formed on the cam; and the positioning of the unit for the disengagement of the shoulders 106 and 102 is effected against the pressure of the loading spring 118.

The rotation of the spool to reel in the line is effected by a handle 120 (FIGURES 14, 15 and 16) which is composed of a ring 121, an arm 122 extending radially from the ring 121, and a laterally located handle 123 having a swivelled mounting at the outer end of the arm 122. The ring 121 is mounted for rotation upon the peripheral surface of a concentric boss 124 provided upon the journal member 107. The handle 120 and the journal member 107 are operatively connected to remain stationary or to rotate as one. The operative connection between the handle 120 and the journal member 107 consists of a spring loaded pin 125 mounted within a recess 126 formed in the journal member and by means of its loading spring engageable in any one of a series of recesses 127 formed in the flat surface of the ring 121. Thus, when the handle is turned to reel in the line, the shoulders 106 and 102 being in engaged relation at such time, the journal member turns with the handle. The handle 120 is removably mounted upon the boss 124 of the journal member. For the purpose of removal and replacement of the handle and also of holding it in its operative position the boss 124 is formed with a peripheral groove 128 and the handle ring 121 carries pivoted fingers 129, each provided with a projection 130 (FIGURE 14) which is engageable in the groove 128, thereby to hold the handle against displacement from the journal member 107. When the fingers 129 are moved to disengage their projections 130 from the groove 128 (as shown in FIGURE 15) the handle may be freely disconnected from the journal member 107.

Figure 47:
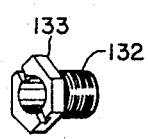
FIGURE 47 is a perspective view of a tubular screw part associated with the arbor.
Figure 48:
FIGURE 48 is an elevation of a loading spring associated with the arbor carried collar.

At its inner or right end, FIGURE 15 being considered, the arbor 53 is formed with internal threads 131 for engagement by the threads of a tubular bolt 132 (FIGURES 18 and 47) having a head 133 formed with diametrically alined grooves for engagement by a spanner wrench when the bolt 132 is to be removed or replaced. The bolt 132 confines a collar 134 (FIGURES 15, 44, 45 and 46) having an inwardly directed annular flange 135 which is clamped between the bolt head 133 and the end of the arbor. The collar 134 provides an abutment for the spring 118, the opposite end of which bears against the shoulder 119 of the cam 112.

Figure 39:
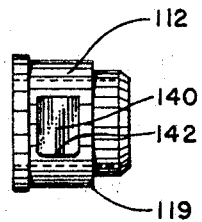
FIGURE 39 is a side elevation of the cam shown in FIGURE 38 as viewed in the plane 39—39 of FIGURE 38.

The journal member 107 is formed with a radial opening 136 (FIGURE 15) for a pin 137 urged inward by a loading spring 138 which is confined by a ring 139 immovably fitted in a peripheral recess of the journal member. The cam 112 has a marginal recess 140 (FIGURES 15, 37 and 39) extending along a chord of its circle and registering with an opening 141 in the cam collar 111, the recess providing a radially directed shoulder 142. The lineal extent of the recess 140 and the opening 141 is such as to provide for the movement of the cam collar 111 and the enclosed cam 112 lengthwise along the arbor to an extent sufficient for the disengagement of the shoulders 106 and 102. The function of the cam 112 is to effect and maintain the disengagement of the shoulders 106 and 102 when the line is being paid out. For the purpose of this function the arbor carries the radially projecting pin 117 and the cam is provided with an angularly directed cam slot 144 (FIGURES 15 and 40) which extends through an arc of approximately 180°. When the shoulders 106 and 102 are to be disengaged and so held the handle 120 is turned in the direction (opposite to its movement when the line is to be reeled in) to cause the movement of the cam 112 through an arc limited by the extent of the slot 144, such movement of the cam being effected by the engagement of the pin 137 against the shoulder 142. In such turning movement of the cam the pin 117, as engaged in the slot 144, causes the cam to move to the right, FIGURE 15 being considered, and effect a corresponding movement of the journal member 107 and the clutch plate 103 for a distance sufficient to disengage the shoulders 106 from the shoulders 102, the handle thereupon remaining stationary while the line is being paid out. When the line is to be reeled in the handle is turned in the opposite direction, the first effect of such movement being to restore the engagement of the shoulders 106 and 102 and thereby effect the rotation of the gear casing and the spool. In each revolution of the journal member 107 as effected by the handle the pin 137 rides idly along the peripheral surface of the cam 112, snapping over the shoulder 142 into and moving through the recess 140.

The change from one gear ratio to another is in accordance with the opening and closing of a passage which subtends the peripheral surface of the arbor and is provided by a peripheral groove 145 (FIGURES 15 and 18). The element under the control of the fisherman for effecting the opening and closing of the passage 145 is a shift rod 146 (FIGURES 15, 17 and 19) slideably mounted in the coaxial opening of the arbor 53. The arbor is internally threaded at its outer end to accommodate a screw shank 147 having a head 148 and a terminal recess 149. The shift rod 146 is urged to the right, FIGURE 15 being considered, by a loading spring 150 fitted within the recess 149 and bearing upon an annular shoulder 151 at the adjacent end of the shift rod. The rod 146 extends through the tubular bolt 132 and through an opening in a retaining latch 152 (to be later described). At its right end, FIGURE 15 being considered, the shift rod 146 is formed with an internally threaded recess 153 to accommodate the threaded shank 154 of a shift button 155. The movement of the shift rod to the left is effected by finger pressure upon the shift button 155.

The opening and closing of the passage 145 is directly effected by a gate 156 (FIGURES 17, 17a, 18, 18a and 19) carried by and movable with the shift rod and having a portion 157 which projects beyond its periphery. The gate 156 is constituted by a longitudinally extending key fitted conformably in a recess 158 subtending the peripheral surface of the shift rod and preferably projecting radially from the shift rod through a slot 156a in the arbor, the slot being of sufficient length for the movement of the gate between its two positions. The gate projection 157 is formed with a recess 159 which, in the position of the shift rod at the left, FIGURE 15 being considered, registers with the passage 145, the gate thereby being open, and in the position of the shift rod at the right is beyond the gate 156, the gate thereby being closed by the outwardly directed part of the projection 157. With the gate open the pin 95 of the gear carrying disc 87 is movable along the periphery of the arbor and through the passage 145 and the recess 159 of the gate. With the gate closed the pin 95 in one operation of the reel abuts the gate as a stop and in another operation rides over the gate. For cooperation with the pin 95 in its gate-abutting position the projection 157 is in offset relation to the body of the gate, thereby providing a shoulder 160 extending lengthwise of the gate and against which the pin 95 bears. To enable the pin 95 to ride over the gate the side of the projection 157 opposite the shoulder 160 is curved to provide a cam 161 (FIGURE 19).

With the gate closed, as shown in FIGURE 15, the pin 95 of the disc 87 is held in engagement with the gate 156 (FIGURE 23) by the engagement of the pawl 99 against the key 78. With the pin 95 so held the gear casing 50 is rotated at a multiple of the speed of the handle, the disc 87 at such time also being rotated at the same speed. Thus the gear 85, operating as a drive gear, effects the rotation of the disc 87 and the resultant rotation of the gear casing. The transmission of power from the handle to the spool is as follows: The annular member 107, together with the attached clutch plate 103, is directly rotated by the handle; the shoulders 106 of the clutch plate by engagement with the shoulders 102 effect the rotation of the gear 85 at the speed of rotation of the handle; the gear 85 rotates the meshing gear 91 carried by the disc 87 at a multiple of the speed of the handle, the gear 91 rotates the gear 92 at the same multiple; the gear 92 rotates the gear 76 which is mounted in fixed relation upon the outer gear casing member 51 with resultant multiple speed rotation of such member; the pawl 99 on the disc 87 by its engagement with the key 78 will positively insure the abutting relation of the pin 95 with the gate 156; the inner member 52 of the gear casing, as keyed to the outer gear casing member 51, will rotate relatively to the gear 85 at the same multiple speed of the gear casing; and since the outer gear casing member 51 is keyed to the spool 1 by the pin 61 the spool will be rotated by such member at the determined multiple speed to reel in the line. The above operations are effected when the shift rod, as shown in FIGURE 15, is held in its position at the right under the pressure of its loading spring 150.

In order to rotate the spool at a one to one ratio the shift rod is pushed to the left, FIGURE 15 being considered, against the pressure of its loading spring 150 and is latched by the retaining latch 152 in a manner to be later described. The shift rod, as moved to the left, moves the gate 156 to its open position in which, the line being reeled in, the pin 95 of the disc 87 passes freely through the passage 145 and the recess 159. Thereby the disc 87 rotates freely at the same rate as the handle, the driving gear 85 rotating with the handle and the remaining gears 91 and 92 being without individual rotation about their axis but traveling as a system in a circular orbit, making one revolution for each revolution of the handle. With the parts in this relation the pawl 99 on the disc 87 engages the guide key 78 and directly rotates the gear casing at the same speed of rotation as the handle. Stated otherwise, the gear 85 rotates with the handle and the rest of the gear system is locked, so to speak, to the gear 85 and rotates with it whereby the turning movement of the gear casing is effected by engagement of the pawl 99 with the key 78.

It will be noted that the multiple ratio of rotation of the spool and the one to one ratio involve the same system of gears and that the change from one ratio to the other is effected without any shifting of the gears and solely by the axial movement of the shift rod 146 and the corresponding movement of the gate 156. It will be noted that the pull of the fish is not transmitted directly from the spool to the handle, as in the construction shown in my patent. However, regardless of what gear ratio is being used at the time and if the fisherman is reeling the fish in, any pull by the fish which is greater than the power applied to the handle and spool, the spool will be rotated by the fish to play out the line and this action will cause the clutches 102 and 106 to separate thus disconnecting the journal member 107 and the handle 123 from the spool leaving the spool under control of the drag.

When the line is paid out in casting or trolling or when the fish takes the lure the spool (and with it the gear casing and the enclosed system of gearing) runs free. This free running of the spool may occur with the gate 156 in its closed or open position. If the gate be closed during the free running of the spool the pin 95 of the disc 87 will ride over the cam surface 161 of the gate and move along the periphery of the arbor. If the gate be open during the free running of the spool the pin 95 moves through the gate recess 159. It will be noted that when the line is being paid out the cam 112 is moved to the right, FIGURE 15 being considered, to disengage the shoulders 106 from the shoulders 102, as above explained in detail, to enable the free running of the gear casing and the spool. However, the spool in such circumstances is under control of the drag.

FIGURE 17b shows a colorable variation in the arrangement of the gate. In this figure the gate extends from the shift rod at an angle to the radius whereby the shoulder 160 and the cam face 161 are not necessary. With the gate closed the pin 95 engages in the acute angle formed by the gate and the surface of the passage 145 when the line is reeled in and when the line is paid out rides over the opposite side of the gate which forms an obtuse angle with the passage 145 and thereby serves the function of the cam face 161 above referred to. In the embodiment of FIG. 17b the primed numerals denote structure which is functionally analogous to structural elements in the other figures which are denoted by corresponding unprimed numerals.

Figure 49:
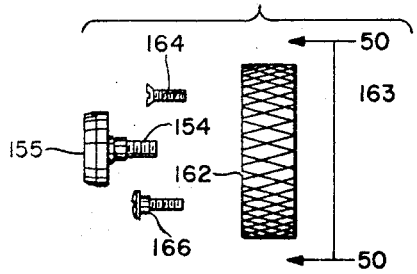
FIGURE 49 is an elevation with parts in exploded relation of a latching assembly for the shift rod used in varying the ratio of the gears.
Figure 50:
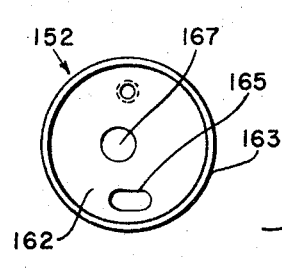
FIGURE 50 is a side elevation of the latch element of the assembly shown in FIGURE 49 as viewed in the plane 50—50 of FIGURE 49.

In FIGURE 15 the shift rod 146 is shown as held by its loading spring in its projected position, that is to say its position at the right, wherein when the handle is turned to reel in the line the spool is rotated at a multiple ratio. When the shift rod is pushed by the shift button 155 to its retracted position, i.e., its position at the left, in order to effect the one to one ratio of spool rotation, the retaining latch 152 is operative to hold it in such position. The latch 152 (FIGURES 15, 49 and 50) includes a plate 162 provided with an annular marginal flange 163 directed toward the journal member 107. The plate 162 is carried by the collar 134 to which it is attached by a screw 164 serving as a pivot, the pivotal movement of the plate being limited by a slot 165 which accommodates the shank of a second attachment screw 166. The shift rod 146 extends through an opening 167 in the latch plate 162. The opening 167 is somewhat eccentrically located and is of suitably greater diameter than the shift rod, its eccentric location avoiding bias on the shift rod when the retaining latch is moved about its pivot. The pivotal movements of the latch plate 162 are for the purposes of holding the shift rod in its retracted position and of releasing it for movement to its projected position. The latch 152 is biased by a spring 168 fitted in a recess in the collar 134 and bearing upon the flange 163. The shift button 155 is spaced from the adjacent end of the shift rod 146 to provide a recess 169. When the shift rod is moved to its retracted position the spring 168 moves the latch 152 about its pivot with the resultant engagement of the wall of the opening 167 in the recess 169, thereby positively to hold the shift rod in its retracted position. When the movement of the shift rod to its projected position is desired thumb pressure is applied to the flange 163 to move the latch in the opposite direction, that is to say against the pressure of the spring 168, whereupon the wall of the opening 167 is removed from the recess 169 and the shift rod will be released, its loading spring thereupon effecting its movement to its projected position.

From the foregoing description it will be manifest that the changes in the gear ratios are effected instantly, effortlessly and without shifting of gears. Thus, for the change from the multiple ratio assumed in FIGURE 15 to the one-to-one ratio the shift rod 146 is pushed to its retracted position by thumb pressure applied to the button 155 and the latch element 162 is thereupon instantly and automatically operative by the spring 168 to hold the shift rod in its retracted position; and for the change from one-to-one ratio to the multiple ratio the latch 152 is moved by thumb pressure to release the shift rod 146 which is thereupon instantly and automatically moved by its loading spring to its projected position. The instantaneousness of these operations and the facility with which they are effected enable the fisherman, in connection with the drag or braking action applied upon the floating disc 18, to maintain the line taut at substantially all times.

These characteristics of the operation of the reel are of the greatest value in compensating for the lunges of the fish at varying speeds and in varying directions and in ultimately landing the fish, the possibility of the loss of the fish because of slackness in the line being virtually eliminated.

The base 79 of the inner gear casing member 52 has its face which adjoins the clutch plate 103 provided with an annular series of recesses 170 corresponding in form and number to the recesses 127 of the handle ring 121 but relatively to the recesses 127 being in staggered relation. The recesses 170 cooperate with the driving pin 125 of the journal member 107 to enable the removal and replacement of the spool. In the removal of the spool the handle 120 is first removed from the reel and then turned so that any plain surface between the recesses 127 will engage the pin 125 to force the pin 125 against the force of the spring 126 into one of the recesses 170. The registry of the pin 125 in one of the recesses 170 having thus been established. The handle 120 is slightly rotated to turn the spool and release the pin 61 from the bayonet slot 62 thus limiting the removal of the spool from the cage. This part of the slot is continued along the outer wall 13 of the spool and with the projection 61 registering with the longitudinally directed part of the slot, the spool will be freely removable from the cage element and another spool having a line of different length or character may be freely substituted. Upon such substitution the gear casing and the spool are restored to their normal positions and the handle is connected by being moved to a position in which one of its recesses 127 registers with the driving pin 125 which, under the pressure of its loading spring, engages in such recess, the pin 125 of course being disengaged at such time from any of the recesses 170 of the gear casing member 52.

Different fisherman have different preferences in respect to the angle at which the handle may be positioned while the fisherman is awaiting a strike. The series of recesses 127 in the handle ring 121 enables the fisherman to position the radially directed handle arm 122 (and hence the handle 123) at any angle that he may desire.

Figure 2:
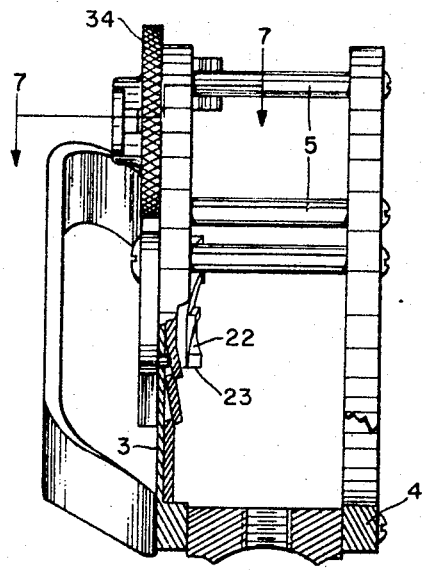
FIGURE 2 is an elevation, with parts shown in section, viewed at an angle of ninety degrees from the side elevation of FIGURE 1, the reel cage, the spool and sundry associated elements omitted for clarity of illustration.

The wall 3 of the cake element is preferably provided with a hand grip 171 (FIGURES 1 and 2) having angularly directed terminal extensions 172 and 173, the extension 172 being connected to the wall by one of the screws 8 and the extension 173 being similarly connected by two of the screws 8a. The use of the hand grip 171 as grasped by one hand and the handle of the reel as grasped by the other hand tends to stabilize the reel when the fish has taken the lure and advantageously enables the fisherman to exercise a two-handed pull while fighting the fish. While the fisherman is holding the reel as explained above the hand grip 171 is in such a position that the drag adjuster and brake applicator are directly under the thumb of the fisherman and therefore full control of the reel is had at all times.

It will be understood that the reel is herein shown in a form now considered as preferred and that the descriptions of the details of the several parts of the reel and of their relation are not to be considered as imposing any limitation upon the claims which may not be inherent in their terms or intent.

I claim:
1. A fishing reel comprising, in combination: a spool having a central hub; a gear casing mounted within the hub and comprising outer and inner members delimiting a closed chamber; a key connecting the members for rotation as one in either direction; a fixed central arbor upon which the members are rotatably mounted; a driving spur gear surrounding the arbor and journaled for rotation in the inner gear casing member; a second spur gear surrounding the arbor and connected in fixed relation to the outer gear casing member; a gear carrying disc mounted within the chamber for rotation upon the arbor; a spur gear carried by the disc and meshing with the driving spur gear; a second spur gear carried by the disc and meshing with the second spur gear surrounding the arbor; a shaft eccentrically journaled in the disc and upon which the disc carried spur gears are mounted; means of connection between the gear casing and the spool for causing the spool and the gear casing to rotate as one; a handle mounted for rotation about an axis coincident with the axis of the arbor; means for causing the gear casing to be rotated by the handle as turned to reel in the line and for enabling the gear casing to rotate in the opposite direction free of the handle when the line is paid out from the spool; the diameters of the spur gears being selected to provide for the rotation of the gear casing at a speed which is a multiple of the speed of rotation of the handle as turned to reel in the line; the arbor having a peripheral passage; a gate mounted for slideable movement relatively to the arbor and having a recess, the gate having an open position in which its recess registers with the passage in the arbor and a closed position in which its recess is out of registry with the passage in the arbor, the gate thereby closing the passage; the selected position of the gate determining the ratio of the rotation of the spool relatively to the rotation of the handle when the line is reeled in; means carried by the disc and cooperating with the gate in its closed position for holding the disc against turning movement relatively to the gear casing whereby the gear casing is rotated at a multiple of the rotation of the handle as turned to reel in the line; and means under the control of the fisherman for effecting the movement of the gate to either its open or closed positions; the gate in its open position enabling the rotation of the disc along the periphery of the arbor occurring when the line is paid out from the spool and also when the handle is turned to reel in the line with the several spur gears rotating as a series to effect the rotation of the gear casing at a one to one ratio relatively to the turning movement of the handle.

2. A fishing reel as set forth in claim 1 wherein the gear carrying disc is positioned between the driving spur gear and the second spur gear surrounding the arbor and the spur gears carried by the disc are located at opposite sides of the disc.

3. A fishing reel as set forth in claim 1 wherein the arbor is tubular and the means for effecting the movement of the gate comprises a spring loaded shift rod slideably mounted within the arbor and provided with a shift button accessible to the fisherman for effecting changes in the position of the shift rod, the gate is carried by the shift rod and said peripheral passage in said arbor being formed as a slot through which the gate projects and within which it is movable.

4. A fishing reel as set forth in claim 1 wherein the means carried by the disc and cooperating with the gate for holding the disc against turning movement relatively to the gear casing consists of a spring loaded radially movable pin which rides over the gate when the gear casing is rotated in the direction in which the line is paid out and the disc is provided with a spring loaded pawl movable beyond its periphery and engageable with the key connecting the gear casing members, thereby to cause the rotation of the gear casing, the pawl being formed to ride over the key when the gear casing is rotated in the direction in which the line is paid out.

5. A fishing reel as set forth in claim 1 wherein the arbor is tubular, the means for effecting the movement of the gate comprises a spring loaded shift rod slideably mounted within the arbor and provided with a shift button accessible to the fisherman for effecting changes in the position of the shift rod, the gate is carried by the shift rod, the arbor is formed with a slot through which the gate projects and within which it is movable, the shift button having a portion spaced from the adjacent end of the shift rod to define a recess and a movably mounted retaining latch under the control of the fisherman is provided for disposition in and removal from the recess, the retaining latch as disposed in the recess holding the shift rod in a position in which the gate is open and as removed from the recess enabling the movement of the shift rod by its loading spring to a position in which the gate is closed.

6. A fishing reel as set forth in claim 1 wherein the arbor is tubular, the means for effecting the movement of the gate comprises a spring loaded shift rod slideably mounted within the arbor and provided with a shift button accessible to the fisherman for effecting changes in the position of the shift rod, the gate is carried by the shift rod, the arbor is formed with a slot through which the gate projects and within which it is movable, the shift button having a portion spaced from the adjacent end of the shift rod to define a recess, a movably mounted retaining latch under the control of the fisherman is provided for disposition in and removal from the recess, the retaining latch as disposed in the recess holding the shift rod in a position in which the gate is open and as removed from the recess enabling the movement of the shift rod by its loading spring to a position in which the gate is closed, a tubular bolt having a head is tapped into the inner end of the arbor, the shift rod extending through the bolt, a collar which extends beyond the periphery of the arbor is clamped between the bolt head and the inner end of the arbor, and the retaining latch is pivotally connected to the collar and is spring loaded for movement to a position in which it engages in the recess defined by the shift button and the adjacent end of the shift rod.

7. A fishing reel as set forth in claim 6 wherein the retaining latch includes a plate formed with an opening through which the shift rod is movable, the opening being eccentrically located and of greater diameter than the shift rod.

8. A fishing reel as set forth in claim 1 wherein a journal member surrounds the arbor in adjacency to the inner gear casing member and is formed with a concentric boss provided with an annular groove, the handle is composed of a ring, an arm extending radially from the ring, and a laterally located finger piece carried by the arm, the ring of the handle is mounted upon the boss of the journal member and carries movable fingers for engagement in and disengagement from the annular groove, a spring loaded pin connects the journal member and the arm of the handle and the journal member carries and operates the means for causing the gear casing to be rotated by the handle as turned to reel in the line.

9. A fishing reel as set forth in claim 1 in which the driving spur gear is fixed to a clutch ring surrounding the arbor, the clutch ring is formed with an annular series of arcuate cams providing radially directed shoulders, a journal member surrounds the arbor and is located inwardly of the inner gear casing member, means connecting the journal member to the handle for rotation upon the arbor when the handle is turned, a clutch plate is attached to the journal member and has a hub formed with an annular series of arcuate cams providing radially directed shoulders, the shoulders of the clutch plate cams engaging the shoulders of the clutch ring cams when the handle is turned to reel in the line, the journal member and the attached clutch plate being shiftable along the arbor to a position in which the shoulders provided by the two series of cams are disengaged, means are provided for holding the shoulders of the two series of cams in normally engaged relation and means under the control of the handle is provided for shifting the journal member and the attached clutch plate to the position in which the shoulders are disengaged, thereby to enable the gear casing to rotate free of the clutch plate when the line is being paid out.

10. A fishing reel as set forth in claim 9 in which the means for shifting the journal member and the attached clutch plate from their normal positions includes a cylindrical cam enclosed within the journal member and about which the journal member is rotatable, the cam being directly shiftable upon the arbor and being so fitted within the journal member as to effect its shifting movement when the shoulders provided by the two series of arcuate cams are to be disengaged, the cam having on its peripheral surface a recess which provides radially directed shoulders, a spring loaded pin is carried by the journal member for engagement with the shoulder of the cam, the cam is provided with a slot extending in an angular direction through an arc of the order of 180°, the arbor is provided with a radially projecting pin which engages in the slot of the cam, and the means for holding the shoulders of the two series of cams in normally engaged relation consist of a loading spring bearing upon an annular shoulder provided upon the cylindrical cam.

11. A fishing reel as set forth in claim 9 in which the means for shifting the journal member and the attached clutch plate from their normal positions includes a cylindrical cam enclosed within the journal member and about which the journal member is rotatable, the cam being directly shiftable upon the arbor and being so fitted within the journal member as to effect its shifting movement when the shoulders provided by the two series of arcuate cams are to be disengaged, the cam having on its peripheral surface a recess which provides a radially directed shoulder, a spring loaded pin is carried by the journal member for engagement with the shoulder of the cam, the cam is provided with a slot extending in an angular direction through an arc of the order of 180°, the arbor is provided with a radially projecting pin which engages in the slot of the cam, the means for holding the shoulders of the two series of cams in normally engaged relation consists of a loading spring bearing upon an annular shoulder provided upon the cylindrical cam, and a collar encloses and is attached to the cylindrical cam and has an opening which registers with the recess of the cam, the spring loaded pin in each revolution of the journal member as rotated by the handle when the line is reeled in riding along the peripheral surface of the collar and snapping into and moving from the opening in the collar and the recess of the cam.

12. A fishing reel as set forth in claim 1 in which the driving spur gear is fixed to a clutch ring surrounding the arbor, the clutch ring is formed with an annular series of arcuate cams providing radially directed shoulders, a journal member surrounds the arbor and is located inwardly of the inner gear casing member, means connecting the journal member to the handle for rotation upon the arbor when the handle is turned, a clutch plate is attached to the journal member and has a hub formed with an annular series of arcuate cams providing radially directed shoulders, the shoulders of the clutch plate cams engaging the shoulders of the clutch ring cams when the handle is turned to reel in the line, the journal member and the attached clutch plate being shiftable along the arbor to a position in which the shoulders provided by the two series of cams are disengaged, means under the control of the handle is provided for shifting the journal member and the attached clutch plate to the position in which the shoulders are disengaged, thereby to enable the gear casing to rotate free of the clutch plate when the line is being paid out, such means including a cylindrical cam about which the journal member is rotated, a collar which extends beyond the periphery of the arbor is held in fixed relation to the arbor adjacent its inner end, the cylindrical cam is provided with an annular shoulder, and a loading spring reacts against the annular shoulder of the cylindrical cam and the collar, the loading spring holding the journal member in a position upon the arbor in which the shoulders of the two series of cams are in normally engaged relation.

13. A fishing reel as set forth in claim 1 wherein a journal member surrounds the arbor in adjacency to the inner gear casing member and is formed with a concentric boss, the handle is composed of a ring, an arm extending from the ring and a laterally located finger piece carried by the arm, the ring of the handle is mounted upon the boss of the journal member, a spring loaded pin is carried by the journal member and connects the journal member and the arm of the handle whereby the journal member is rotated by the handle when the line is to be reeled in, and a clutch plate is attached to the journal member and has an opening through which the pin may be moved, the ring of the handle having an annular series of recesses in any selected one of which the spring loaded pin normally engages in its function of connecting the journal member to the handle, the journal member having a face which adjoins the clutch plate and is provided with an annular series of recesses in staggered relation to the recesses in the ring of the handle and the spring loaded pin is movable by finger pressure through the opening in the clutch plate for engagement in any selected one of the recesses of the journal member, thereby upon the removal of the handle from the journal member to enable the removal of the spool from the gear casing.

14. A fishing reel as set forth in claim 9 wherein the inner gear casing member has an inner side portion of reduced diameter to provide an annular shoulder, the journal member is formed with an outwardly projecting annular flange which fits over the reduced portion of the inner gear casing member and abuts the annular shoulder, and the annular flange encloses the clutch plate and in the assembly of the reel facilitates its centering relatively to the journal member.

15. A fishing reel as set forth in claim 1 wherein the outer gear casing member is formed on its outer side with an annular recess, a ball bearing is fitted upon the arbor and is confined in the recess, the inner gear casing member is formed on its inner side with an annular recess, a second ball bearing is confined in the annular recess of the inner gear casing member a centrally located clutch ring is mounted for rotation within the inner gear casing member and surrounds the arbor, the second ball bearing is mounted upon the clutch ring and a clutch plate is rotatably mounted upon the arbor for axial shifting movement between operative and inoperative positions and in its operative position cooperates with the clutch ring and abuts the second ball bearing.

16. A fishing reel as set forth in claim 1 wherein the spool is mounted within a cage which includes a wall adjacent the outer gear casing member, the wall having a central annular boss, a floating disc is mounted upon the boss, manually controlled means is carried by the wall for applying braking pressure to the floating disc, the floating disc is formed with an annular series of arcuate cams which provide radially directed shoulders and the inner gear casing member is provided with a spring loaded pin for engagement with the annular shoulders to cause the floating disc to rotate with the gear casing when the line is being paid out, the pin riding over the cams when the gear casing is rotated in the direction in which the line is reeled in.

17. A fishing reel comprising, in combination: a spool having a central hub; a gear casing mounted within the hub and comprising outer and inner members delimiting a closed chamber; a key connecting the members for rotation as one in either direction; a fixed central arbor upon which the members are rotatably mounted; a train of gear elements within the closed chamber, one of the gear elements being a driving element located in adjacency to the inner gear casing member; another of the gear elements being a driven element and being supported in fixed relation by the outer gear casing member; first means operatively connecting between the train of gear elements and the gear casing for effecting the rotation of the gear casing in the direction in which the line is reeled in; second means operatively connecting the gear casing and the spool for causing the spool and the gear casing to rotate as one; a clutch ring mounted for rotation upon the arbor and upon which the inner gear casing member is rotatably mounted; the driving gear element being connected in fixed relation to the clutch ring; a clutch plate rotatably mounted upon the arbor for axial shifting movement between operative and inoperative positions and in its operative position cooperating with the clutch ring to effect its rotation and the rotation of the driving gear element in the direction in which the line is reeled in; a handle mounted for rotation about an axis coincident with the axis of the arbor; means for causing the clutch plate to be rotated by the handle as turned to reel in the line; and means under the control of the handle for moving the clutch plate to its inoperative position when the line is to be paid out, thereby to enable the free rotation of the gear casing and the idle rotation of the train of gear elements while the handle is held stationary.

18. A fishing reel comprising, in combination: a spool having a central hub; a fixed central arbor extending through the hub; a driving spur gear surrounding the arbor; a second spur gear surrounding the arbor; a gear carrying disc mounted within the hub for rotation upon the arbor; a spur gear carried by the disc and meshing with the driving spur gear; a second spur gear carried by the disc and meshing with the second spur gear surrounding the arbor; a shaft eccentrically journaled in the disc and upon which the disc carried spur gears are mounted; a handle mounted for rotation about an axis coincident with the axis of the arbor; driving means for the spool mounted within the hub and connected directly to the hub for rotation as one with the spool; the driving spur gear being rotatably carried by the driving means and the second spur gear being carried in fixed relation by the driving means; means for causing the driving means to be rotated by the handle as turned to reel in the line and for enabling it to rotate in the opposite direction free of the handle when the line is paid out from the spool; the diameters of the spur gears being selected to provide for the rotation of the driving means at a speed which is a multiple of the speed of rotation of the handle as turned to reel in the line; the arbor having a peripheral passage; a gate mounted for slideable movement relatively to the arbor and having a recess, the gate having an open position in which its recess registers with the passage in the arbor and a closed position in which its recess is out of registry with the passage in the arbor, the gate thereby closing the passage; the selected position of the gate determining the ratio of the rotation of the spool relatively to the rotation of the handle when the line is reeled in; means carried by the disc and cooperating with the gate in its closed position for holding the disc against turning movement relatively to the driving means whereby the driving means is rotated at a multiple of the rotation of the handle as turned to reel in the line; and means under the control of the fisherman for effecting the movement of the gate to either its open or closed position; the gate in its open position enabling the rotation of the disc along the periphery of the arbor when the line is paid out from the spool and also when the handle is turned to reel in the line, the several spur gears at such time rotating as a series to effect the rotation of the driving means at a one-to-one ratio relatively to the turning movements of the handle.

19. A fishing reel comprising a frame, an arbor carried on said frame, a gear casing rotatably mounted on said arbor, a spool surrounding said casing and connected thereto for rotation, a gear train having a driving gear, a driven gear and intermediate gears of different diameters, input means connected to the driving gear for rotation thereof, means connecting said driven gear to said gear casing, an intermediate carrier disc rotatably mounted on said arbor, said carrier disc having oppositely extending flanges forming journals for said driving and driven gears, eccentric means on said carrier disc coaxially supporting an intermediate gear on each side thereof, and selective means supported by the arbor and releasably connected to said carrier disc to effect a change in the drive ratio of said input means relative to said gear casing.

20. A fishing reel as set forth in claim 19, with said carrier disc having pin means thereon, said selective means comprising a gate slidably mounted in the arbor, said gate in one position engaging said pin means on said carrier disc to lock the same to the arbor to drive said casing at one speed and in another position to allow each carrier to rotate freely upon the arbor to drive the casing at another speed.

21. A transmission mechanism for converting the rotary motion of a driving member into rotary motion of a driven member at a selected conversion ratio comprising,
   (a) a driven member,
   (b) an arbor upon which the driven member is rotatably journaled,
   (c) a gear train operatively associated with the driven member and including a driving gear and a driven gear and a carrier disc having rotatably mounted thereon at least two intermediate gears meshing with the driving and driven gears,
   (d) means for rotating the driving gear of said gear train at any given speed,
   (e) shift means journaled on the arbor and including a gate movable along the arbor between open and closed positions; and
   (f) means interposed between the carrier disc and gate engaged by the gate when the gate is shifted to closed position to effect rotation of the driven member at one speed and disengaged by the gate when the gate is shifted to open position to effect rotation of the driven member at another speed.

22. The transmission mechanism according to claim 21, in which the gate in closed position constitutes a fixed abutment locking the carrier disc against rotation in one direction relative to the arbor so as to effect rotation of the driven member at a speed correlated to a selected ratio of speeds therebetween and when in its open position releasing the carrier disc to rotate relative to the arbor to effect rotation of the driven member at a different speed correlated to a different ratio.

23. The transmission mechanism according to claim 21, in which the driven member comprises a hollow casing, and the arbor extends through the hollow casing to form a journal therefor.

24. The transmission mechanism according to claim 21, in which the carrier disc is journaled on the arbor, the driving and driven gears lie on opposite sides thereof and have an axis of rotation coincident with the axis of rotation of the carrier disc, and said intermediate gears lie on opposite sides of the carrier disc and rotatable about a common axis radially displaced from the axis of rotation of said driving and driven gears.

25. The transmission mechanism according in claim 21, in which the shift means comprises an elongated shift rod slidably journaled on the arbor for movement therealong between predetermined limits, said gate is fixed on the rod and extends radially therefrom to provide an abutment portion adapted to restrict rotation of the carrier disc in one direction and permit rotation of the carrier disc in the opposite direction.

26. The transmission mechanism according to claim 21, in which clutch means are provided journaled on the arbor between said driving member and said driving gear whereby rotation of the driving member in a driving direction effects automatic engagement of the driving member to the driving gear, and rotation of the driving member in the opposite direction effects automatic disengagement thereof.

27. The transmission mechanism according to claim 21, in which said shift means is spring-pressed to normally retain the gate in closed position, and latch means are provided to lock the shift means to selectively retain the gate in open position.

28. The transmission mechanism according to claim 21, in which said carrier disc is journaled for selective rotation on the arbor, said shift means including the gate is interposed between the carrier disc and the arbor, said means interposed between the carrier disc and gate comprises a lock pin mounted on the carrier disc adjacent its inner periphery and adapted to prevent rotation of the carrier disc in one direction when the gate is in closed position, and a pawl on the carrier disc adjacent its outer periphery to engage the driven member upon rotation of the carrier disc in one direction.

29. The transmission mechanism according to claim 21, in which rotation of the driving gear in one direction when the gate is in closed position effects locking of the carrier disc against rotation in one direction relative to the arbor while permitting relative rotation between the carrier disc and said driven member, and rotation of the driving gear in the same direction when the gate is in open position effects locking of the carrier disc against rotation relative to the driven member while permitting relative rotation between the carrier disc and the arbor.

30. The transmission mechanism according to claim 21, in which rotation of the driving gear in one direction when the gate is in closed position effects locking of the carrier disc against rotation in one direction relative to the gate while permitting relative rotation between the carrier disc and the driven member, and rotation of the driving gear in the same direction when the gate is in open position effects locking of the carrier disc against rotation relative to the driven member while permitting relative rotation between the carrier disc and the gate.

References Cited
UNITED STATES PATENTS

| | | | |
|---|---|---|---|
| 1,998,891 | 4/1935 | Benson | 74—789 |
| 2,174,672 | 10/1939 | Von Soden-Fraunhofen | 74—789 X |
| 2,477,024 | 7/1949 | Webster | 74—789 |
| 2,487,387 | 11/1949 | Sears et al. | 242—84.1 |
| 2,615,352 | 10/1952 | Mies et al. | 242—84.1 |

BILLY S. TAYLOR, *Primary Examiner.*

U.S. Cl. X.R.

74—789